US008149313B2

(12) United States Patent
Watanabe et al.

(10) Patent No.: US 8,149,313 B2
(45) Date of Patent: Apr. 3, 2012

(54) PHOTOGRAPHIC APPARATUS, SETTING METHOD OF PHOTOGRAPHY CONDITIONS, AND RECORDING MEDIUM

(75) Inventors: Makoto Watanabe, Chiba (JP); Hiroki Hosaka, Chiba (JP); Yuichi Onumata, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 385 days.

(21) Appl. No.: 12/473,470

(22) Filed: May 28, 2009

(65) Prior Publication Data
US 2009/0295945 A1 Dec. 3, 2009

(30) Foreign Application Priority Data
Jun. 2, 2008 (JP) ................................. 2008-144088

(51) Int. Cl.
*H04N 5/222* (2006.01)
(52) U.S. Cl. ................ 348/333.02; 348/333.12
(58) Field of Classification Search .................. None
See application file for complete search history.

(56) References Cited

U.S. PATENT DOCUMENTS

| | | | | |
|---|---|---|---|---|
| 5,557,358 A * | 9/1996 | Mukai et al. | ................. | 396/296 |
| 6,301,440 B1 * | 10/2001 | Bolle et al. | ................. | 396/128 |
| 2002/0015514 A1 * | 2/2002 | Kinjo | ........................... | 382/118 |
| 2005/0062875 A1 | 3/2005 | Ojima | | |
| 2006/0192879 A1 * | 8/2006 | Hisamatsu | ............. | 348/333.01 |
| 2007/0065137 A1 * | 3/2007 | Hara et al. | ................... | 396/291 |
| 2007/0268397 A1 | 11/2007 | Udono | | |
| 2007/0291334 A1 | 12/2007 | Nakanishi | | |
| 2008/0024644 A1 | 1/2008 | Sugimoto | | |
| 2009/0059054 A1 | 3/2009 | Oishi et al. | | |
| 2009/0073285 A1 * | 3/2009 | Terashima | ............... | 348/231.99 |

FOREIGN PATENT DOCUMENTS

JP 2002-158903 A 5/2002
(Continued)

OTHER PUBLICATIONS

Extended European Search Report dated Sep. 1, 2009 (7 pages), issued in counterpart European Application Serial No. 09160706.9.
Dpreview, "Sony raises a smile with new W-Series" [Online] dated Jan. 23, 2008, XP002541661 San Diego, retrieved from the Internet, URL:http://www.dpreview.com/news/0801/08012302sonywseries.asp on Aug. 17, 2009.

(Continued)

*Primary Examiner* — Nhan T Tran
*Assistant Examiner* — Dennis Hogue
(74) *Attorney, Agent, or Firm* — Holtz, Holtz, Goodman & Chick, PC

(57) ABSTRACT

In a digital camera 1, when a shutter button is pressed halfway, then a photographic scene is evaluated until the shutter button is fully depressed, and based on automatic parameters corresponding to the evaluated photographic scene which are set, each portion is controlled in accordance with the set automatic parameters (Step S3). Furthermore, tags for manual setting corresponding to the photographic scene evaluated in Step S2 are superimposed on a live view image (Step S5). Whether a touch for any of the tags has been detected is determined (Step S9). If a touch has been detected, manual parameters corresponding to the touched tag in the automatic parameters stored in RAM in Step S3 are changed by one level and updated (Step S13). If the shutter key has been operated, still image photographic processing is performed with the parameters updated and stored in RAM in Step S13 (Step S23).

9 Claims, 4 Drawing Sheets

FOREIGN PATENT DOCUMENTS

| | | | |
|---|---|---|---|
| JP | 2002158903 A | * | 5/2002 |
| JP | 2005-109607 A | | 4/2005 |
| JP | 2005-151375 A | | 6/2005 |
| JP | 2005151375 A | * | 6/2005 |
| JP | 2006-261912 A | | 9/2006 |
| JP | 2007-288449 A | | 11/2007 |
| JP | 2008-011289 A | | 1/2008 |
| JP | 2008-085737 A | | 4/2008 |

OTHER PUBLICATIONS

Japanese Office Action dated Jun. 8, 2010 and English translation thereof, issued in counterpart Japanese Application No. 2008-144088.

* cited by examiner

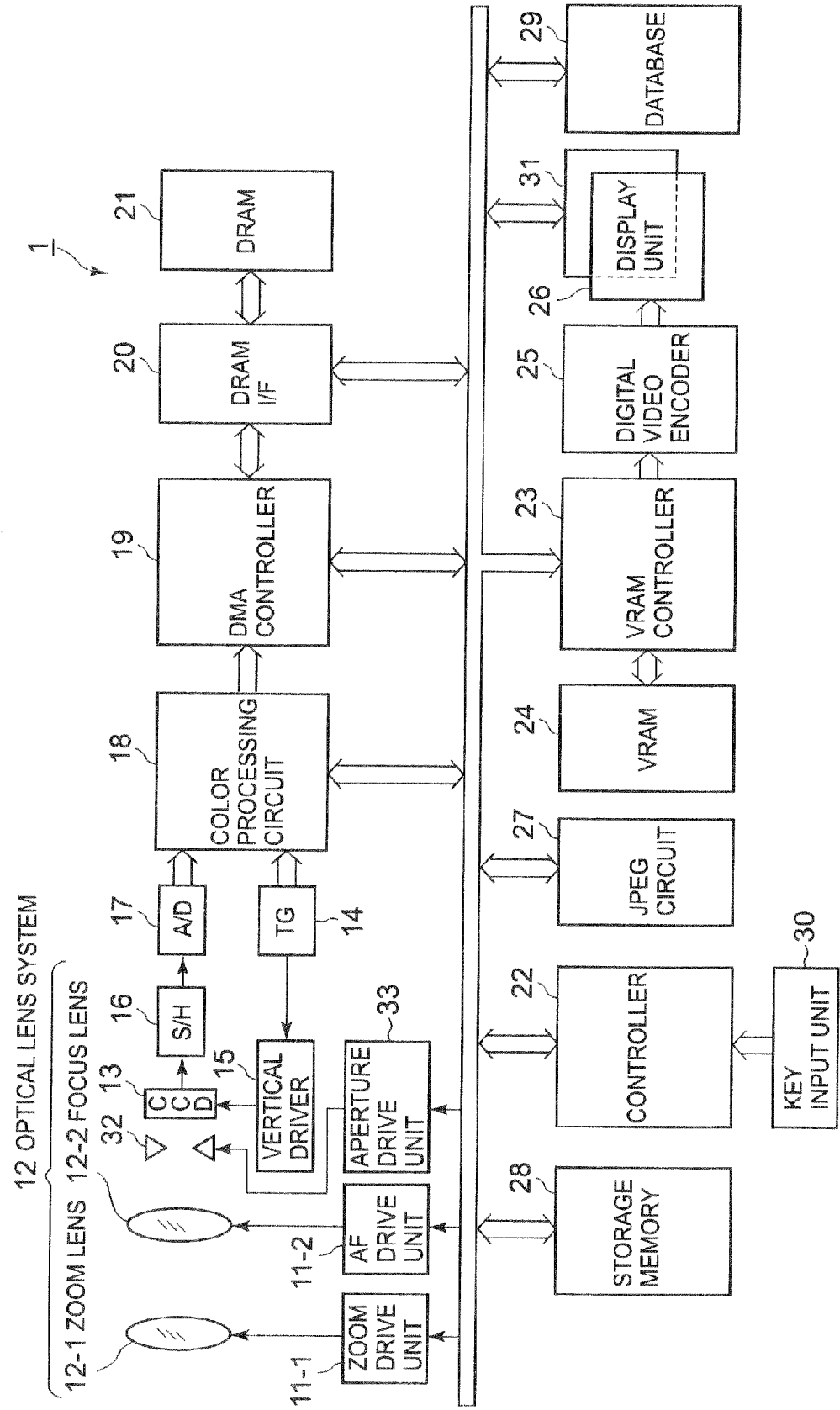

FIG. 2

| PHOTOGRAPHIC SCENE | | DISPLAY TAG | MANUAL SETTING PARAMETERS | AUTOMATIC SETTING PARAMETERS | | | | |
|---|---|---|---|---|---|---|---|---|
| | | | | FOCUS CONTROL | SHUTTER SPEED | APERTURE | EV SHIFT AMOUNT | SENSITIVITY |
| PERSON | MALE | COOL QUIET FRESH | FOCUS CONTROL APERTURE EV SHIFT AMOUNT SENSITIVITY | A-1 | B-1 | C-1 | D-1 | E-1 |
| | FEMALE | PRETTY INTELLECTUAL WHITE SKIN | FOCUS CONTROL SHUTTER SPEED | A-2 | B-2 | C-2 | D-2 | E-2 |
| | CHILD | PRETTY TENDER | | | | | | |
| ANIMAL | PET | PRETTY HEALING TYPE | | | | | | |
| SCENERY | NATURE | DEEP FEEL WIND | | | | | | |
| | SCENERY | FINE WEATHER NEAR FUTURE RETRO | | | | | | |
| CLOSE-UP | MACRO | PREMIUM RETRO | | | | | | |
| | CUISINE | LOOK DELICIOUS HOT FRESH AND COOL | | | | | | |
| | FLOWER | VIVIDLY FANTASTIC CALM | | | | | | |
| NIGHT SCENE | NIGHT SCENE | GLITTERING MOODY | | | | | | |

221

PHOTOGRAPHIC APPARATUS, SETTING METHOD OF PHOTOGRAPHY CONDITIONS, AND RECORDING MEDIUM

This application is based on and claims the benefit of priority from Japanese Patent Application No. 2008-144088, filed on 2 Jun. 2008, the content of which is incorporated herein by reference.

BACKGROUND OF THE INVENTION

1. Field of the Invention

The present invention relates to a photographic apparatus, setting method of photography conditions, and recording medium.

2. Related Art

Conventionally, a so-called "fully automatic camera" that automatically sets photography conditions and performs photography has been proposed (see Japanese Unexamined Patent Application Publication No. 2008-11289). This full automatic camera determines a photographic scene based on a subject image obtained from an imaging device, and automatically sets photography conditions (photography mode) of the camera according to this determined photographic scene. Therefore, without being inconvenienced with setting operations for photography conditions, it is possible for a user to perform photography and recording with appropriate photography conditions according to the photographic scene.

However, for fully automatic cameras, while it is possible for a user to perform photography and recording with appropriate photography conditions according to the photographic scene without being inconvenienced with setting operations for photography conditions, as mentioned above, the intention of the user is entirely unreflected in the photography conditions. Therefore, a demerit arises in that attributes that directly reflect the intention of the user are not imparted to the recorded image at all.

On the other hand, a manual camera is provided allowing photography conditions to be manually set and photography performed. With the manual camera, photography conditions are all manually set, and therefore the user's intention is directly reflected in the photography conditions. Therefore, it is possible to reflect the intention of the user in the recorded image. However, with the manual camera, since the user himself or herself must assess the photographic scene and manually set all photography conditions, even though the user's intention is directly reflected in the recorded image, a demerit arises in that the user is inconvenienced with a setting operation of the photography conditions.

SUMMARY OF THE INVENTION

In view of the above-mentioned problem of the prior art, the present invention has been made, and it is an object of the present invention to provide a photographic apparatus, a setting method of photography conditions, and a recording medium which can solve the demerits of the fully automatic camera and the manual camera together.

In order to attain the above-mentioned problem, one aspect of the present invention provides photographic apparatus comprising: a photographic means: a first storage means for storing a setting image for setting photographic conditions corresponding to a photographic scene; a photographic scene determination means for determining a photographic scene, based on a subject image to be photographed by the photographic means; a display means for displaying a setting image stored in the first storage means, based on the photographic scene determined by the photographic scene determination means; a manual setting means for setting photographic conditions according to a manual operation of a user for a setting image displayed by the display means; and a control means for performing photography by the photographic means in accordance with photographic conditions set by the manual setting means.

Another aspect of the present invention provides a setting method of photographic conditions, including: a photographic step of performing photography; a photographic scene determination step of determining a photographic scene based on a subject image to be photographed; a display step of displaying a setting image for manually setting photographic conditions based on the photographic scene determined by the photographic scene determination step; a manual setting step of setting photographic conditions according to manual operation of a user for a setting image displayed in the display step; and a control step of performing photography in accordance with the photographic conditions set in the manual setting step.

Another aspect of the present invention provides a storage medium storing a program executed by a computer in a camera, causing the computer to execute functions of: a first storage means for storing a setting image for setting photography conditions corresponding to a photographic scene; a photographic scene determination means for determining a photographic scene based on a subject image to be photographed; a display means for displaying a setting image stored in the first storage means, based on a photographic scene determined by the photographic scene determination means; a manual setting means for setting photographic conditions according to a manual operation of a user for a setting image displayed by the display means; and a control means for performing photography under photographic conditions set by the manual setting means.

The present invention can solve the demerits of the fully automatic camera and the manual camera together while reflecting the intention of the user in the photography conditions.

BRIEF DESCRIPTION OF THE DRAWINGS

FIG. 1 is a diagram showing an electronic circuit structure of a digital camera according to an embodiment of the present invention;

FIG. 2 is a schematic diagram showing a photographic scene correspondence table;

DETAILED DESCRIPTION OF THE INVENTION

Figure 3:
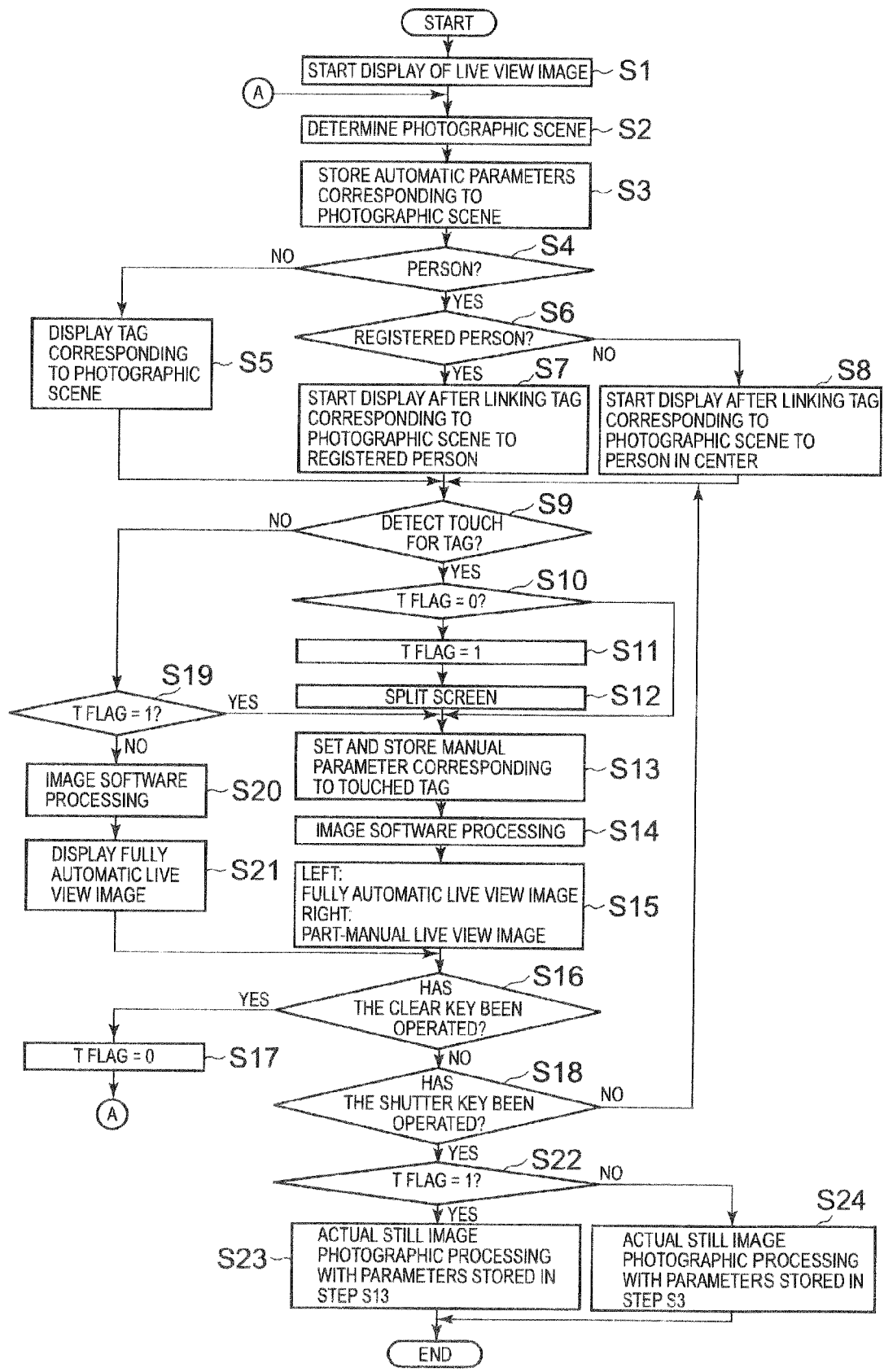
FIG. 3 is a flowchart showing a processing procedure according to the same embodiment.

Hereinafter, an embodiment of the present invention is described with reference to the diagrams.

FIG. 1 is a diagram showing an electronic circuit structure of a digital camera 1 according to an embodiment of the present invention. This digital camera 1 includes a zoom drive unit 11-1 for causing a zoom lens 12-1 to move and perform an optical zoom action, and an AF drive unit 11-2 for causing a focus lens 12-2 to move and perform a focus action, in a photography mode, a lens optical system 12 constituting an imaging lens including the zoom lens 12-1 and the focus lens 12-2, an aperture 32 placed on an optical axis of the lens optical system 12, an aperture drive unit 33 for driving this aperture 32, a CCD 13 which is an imaging device, a timing generator (TG) 14, a vertical driver 15, a sample and hold circuit (S/H) 16, an analog-to-digital (A/D) converter 17, a color processing circuit 18, a DMA (Direct Memory Access) controller 19, a DRAM interface (I/F) 20, and DRAM 21. Furthermore, the digital camera 1 includes a controller 22, a VRAM controller 23, a VRAM 24, a digital video encoder 25, a display unit 26, a JPEG (Joint Photographic Coding Experts Group) circuit 27, and a storage memory 28, together with a database 29 and a key input unit 30. The lens optical system 12 composes an imaging means.

In a monitoring state in the photography mode, the zoom drive unit 11-1, based on a control signal from the controller 22 when there is an optical zoom instruction, changes the magnification ratio of an image to be formed by the CCD 13 by driving the zoom lens drive motor, which is not shown, and thus causing the zoom lens 12-1 to move forwards and backwards along the optical axis. Furthermore, the AF drive unit 11-2 drives the focus lens drive motor, which is not shown, to cause the focus lens 12-2 to move. In addition, the CCD 13, which is an imaging device placed backward along an optical axis of the lens optical system 12, is scan-driven by the timing generator 14 and the vertical driver 15, and outputs, for each fixed period, one frame of photoelectric conversion output corresponding to an optical image formed.

The CCD 13 is a solid-state imaging device that images a two dimensional image of a subject image, and typically takes images of several tens of frames per second. It should be noted that the imaging device is not limited to a CCD, and may be a solid-state imaging device such as a CMOS (Complementary Metal Oxide Semiconductor).

This photoelectric conversion output, after being suitably gain-adjusted for each primary color component of RGB in a signal state of analog value, is sample-held by the sample and hold circuit (S/H) 16, and converted by the A/D converter 17 to digital data (pixels). By the color processing circuit 18, color processing including pixel interpolation processing and gamma correction processing is carried out on the digital data, and a luminance signal Y and chrominance signals Cb and Cr of digital values are generated. Then, the luminance signal Y and chrominance signals Cb and Cr of digital values are output to the DMA (Direct Memory Access) controller 19.

The DMA controller 19 carries out a DMA transfer of the luminance signal Y and the chrominance signals Cb and Cr output by the color processing circuit 18, using a composite synchronizing signal, a memory write enable signal, and a clock signal from the same color processing circuit 18 via the DRAM interface (I/F) 20, to the DRAM 21 used as buffer memory.

The controller 22 controls the whole operations of the digital camera 1, and is constituted by a CPU or MPU, a program storage memory such as a flash memory that stores programs or the like for executing the processing shown in the flowchart described hereinafter, and a RAM or the like used as work memory. In addition, after completion of DMA transfer of the luminance signal and the chrominance signals to the DRAM 21, these luminance and chrominance signals are read out from the DRAM 21 via the DRAM interface 20, and written into the VRAM 24 via the VRAM controller 23. The controller means 22 constitutes a photographic scene determination means, a manual setting means, an automatic setting means, and a generation means.

Furthermore, in response to the operation signal from the key input unit 30, the controller 22 extracts menu data or a processing program stored in the program storage memory such as a flash memory, and, according to the menu data or processing program thus extracted, controls the operation of each function of the digital camera 1, more specifically, photography behavior, live view image display, the operation of playback and display of a recorded image, display of a function selection menu at a time of function selection, display of a setting screen, and the like.

The digital video encoder 25 periodically reads out the luminance and chrominance signals from the VRAM 24 via the VRAM controller 23, generates a video signal based on these data, and outputs the video signal to the display unit 26. The display unit 26 functions as a monitor display unit (electronic finder) in the photography mode, and by performing display in response to the video signal from the digital video encoder 25, displays a live view image in real-time based on image information read in from the VRAM controller 23 at that point. The display unit 26 constitutes a display means.

Furthermore, the controller 22 performs the still image photographic processing in accordance with a photography instruction. In this processing, triggered by an operation of a shutter key, the controller 22 instructs the CCD 13, the vertical driver 15, the sample and hold circuit 16, the color processing circuit 18, and the DMA controller 19 to switch from a live view image photography mode to a still image photography mode. Then, the controller 22 temporarily stores image data obtained through the photographic processing in this still image photography mode into the SDRAM 21

In this state of temporary storage, the controller 22 reads out one frame of luminance and chrominance signals written in the DRAM 21 via the DRAM interface 20, in units called "basic blocks" of 8 pixels high by 8 pixels wide for each of the Y, Cb, and Cr components, to be written to the JPEG circuit 27. This JPEG circuit 27 carries out data compression by performing processing such as ADCT (Adaptive Discrete Cosine Transform) and Huffman coding, which is an entropy coding method, and the like. Then, the encoded data thus encoded is read out from the JPEG circuit 27 as a data file of one image, and is stored in the storage memory 28. Moreover, upon completion of compression processing of one frame of luminance and chrominance signals and writing of all the compressed data to the storage memory 28, the controller 22 instructs switching from the still image photography mode to the live view image photography mode.

Moreover, in the playback mode which is a basic mode, the controller 22 selectively reads out image data stored in the storage memory 28, and uncompresses the compressed image data in a completely opposite order from the data compression procedure carried out by the JPEG circuit 27 in the photography mode. The controller 22, upon extracting the uncompressed image data to the VRAM 24 via the VRAM controller 23, periodically reads out the image data from this VRAM 24, generates a video signal based on these image data periodically read, and causes the display unit 26 to play back and output the video signal.

Furthermore, transparent touch panels 31 are stacked on the display unit 26. The touch panels 31 detect a touch position and input the detected touch position to the controller 22.

It should be noted that the "focus control" in the automatic setting parameters to be described hereinafter is control in which the AF driver unit 11-2 drives the focus lens 12-2, and an "aperture" is control in which the aperture drive unit 33 drives the aperture 32. Furthermore, the "EV Shift Amount" is a value of change of a value representing an amount of light to expose according to a combination of the aperture 32 and the shutter speed. "Sensitivity" is processing to increase sensitivity by enhancing the gain for the CCD 13, and "shutter speed" is charge accumulating time of the CCD 13.

The JPEG circuit 27 can be used with a plurality of compression ratios, and modes corresponding to high-resolution (commonly called "high-definition," "fine," "normal," and the like) of a low compression ratio, and low-resolution (commonly called "economy") of a high compression ratio are available. Furthermore, The JPEG circuit 27 can be used with a range from a high number to a low number of pixels. For example, such recording pixel sizes as SXGA (1600×1200), XGA (1024×768), SVGA (800×600), VGA (640×480), and QVGA (320×240) are available.

Storage memory 28 consists of a storage media such as embedded memory (flash memory), a hard disk, or a removable memory card, and stores and records image data, photographic information, and the like.

The database 29 stores therein image data for collation or a facial recognition table consisting of a plurality of stored facial recognition records consisting of image quality parameters or the like or individual A, B, or C facial recognition data or the like. The database 29 is capable of such updates as new registration, editing, or deletions by key-input operations of a user. The database 29 constitutes a second storage means.

A key input unit 30 is constituted by, for example, a mode dial, cursor keys, a SET key, zoom buttons (a W button and a T button), a shutter key, a clear key, a power button, and the like, and a key processing unit (not shown) which generates, when a key is operated, an operation signal corresponding to the key and sends the signal to the controller 22.

FIG. 2 is a diagram showing a photographic scene correspondence table 221 stored in the ROM in the controller 22 according to an embodiment of the present invention. This photographic scene correspondence table 221 stores a "photographic scene," and a "display tag", "manual setting parameters (manual parameters)," and "automatic setting parameters (automatic parameters)" corresponding to the "photographic scene." As "automatic setting parameters (automatic parameters)," a certain value of the parameter is stored, and as "manual setting parameters (manual parameters)," an offset changing the value of the parameter by one level, that is to say, a ±α value, is stored. The ROM in the controller 22 constitutes a first storage means.

Moreover, it should be noted that the manual setting parameters and automatic setting parameters of FIG. 2 are parameters for a time of still image photography (still image photography mode). Therefore, during the live view photography mode, images having attributes to be obtained at a time of photography with parameters for still image photography are to be generated by image processing (software processing). For the image processing, in the photographic scene correspondence table 221, image processing software corresponding to various parameters is stored, although not shown. Using this corresponding image processing software, by image processing the live view image, a live view image having attributes to be obtained at a time of still image photography with the parameters is generated. For example, in a case of the parameter "shutter speed," as the shutter speed slows down, image processing to increase a brightness of the live view image will be performed by image processing.

The "photographic scene" can be such as a "person (male)," "person (female),"..., or a "night scene," and is a photographic scene determined by processing hereinafter described. A "display tag" is a setting image for having a user set photography conditions corresponding to a determined photographic scene. This "display tag" includes sensory representations for objective impressions of a main subject image, such as "Cool," "Quiet," and "Pretty," for a case of being photographed under photography conditions corresponding to the "display tag."

The "manual setting parameters" are photography conditions set for an occasion of these above-mentioned tags being selected or specified by a user. For example, a case of "Cool" being selected or specified indicates a manual setting of "focus control," and a case of "Quiet" being selected or specified indicates a manual setting of "aperture." The "automatic setting parameters" are photography conditions automatically set in a determined photographic scene, and values such as "focus control," "shutter speed," "aperture," "EV shift amount," and "sensitivity" are stored for each photographic scene.

Moreover, the "manual setting parameters" may be any of the parameters included in "automatic setting parameters," and may also be other parameters not included in "automatic setting parameters," or may be a combination of parameters included and parameters not included in "automatic setting parameters."

In the present embodiment related to the above-mentioned setting, when a user sets a facial registration mode and photographs beforehand a specific person to be registered, the controllers 22 performs registration processing. By this registration processing, characteristics of a face for a photographed person are detected, and characteristic data of a detected face and facial recognition data composed of a facial image and the like are stored in the database 29. Therefore, facial recognition data for a photographed person in the facial registration mode is registered beforehand in the database 29.

In addition, by a user operating the mode dial of the key input unit 30 in order to perform photography, when the photography mode is set, and the "selectable automatic mode" is selected the controller 22 performs such processing as shown in the flowchart of FIG. 3 in accordance with the program. First, display of a live view image is started by the display unit 26 (Step S1). Next, when this live view image is displayed, a photographic scene is determined based on an image of one frame sequentially transferred from the CCD 13 to the DRAM 21 (Step S2).

In this determination of the photographic scene, as disclosed in, for example, Japanese Unexamined Patent Application Publication No. 2008-11289, a distribution of hue data and chroma data on hue-chroma coordinates as attribute information for each of the "photographic scenes" stored in the photographic scene correspondence table 221 is stored in the ROM, and by comparing the distribution of the hue data and chrome data for the image in the DRAM 21 as an attribute of the image with the distribution of each of the "photographic scenes," it is possible to determine to which "photographic scene" the photography image (the image in the DRAM 21) corresponds.

In addition, after the photographic scene is determined in this manner, automatic parameters corresponding to the determined photographic scene are read out from the correspondence table 221, and stored in the RAM in the controller 22 (Step S3). Accordingly, the automatic parameters corresponding to the photographic scene are stored in the RAM in the controller 22.

Next, it is determined whether a person is present in an image in the DRAM 21 (Step S4). Similarly to the determination method in the above-mentioned Step S3, a distribution on hue-chroma coordinates of hue data and chroma data of a face of a person as attribute information is stored beforehand, and by comparing distributions of hue data and chroma data of a face of a person in relation to an image in the DRAM 21 as an attribute of the image, it is determined whether a person is present.

Figure 4A:
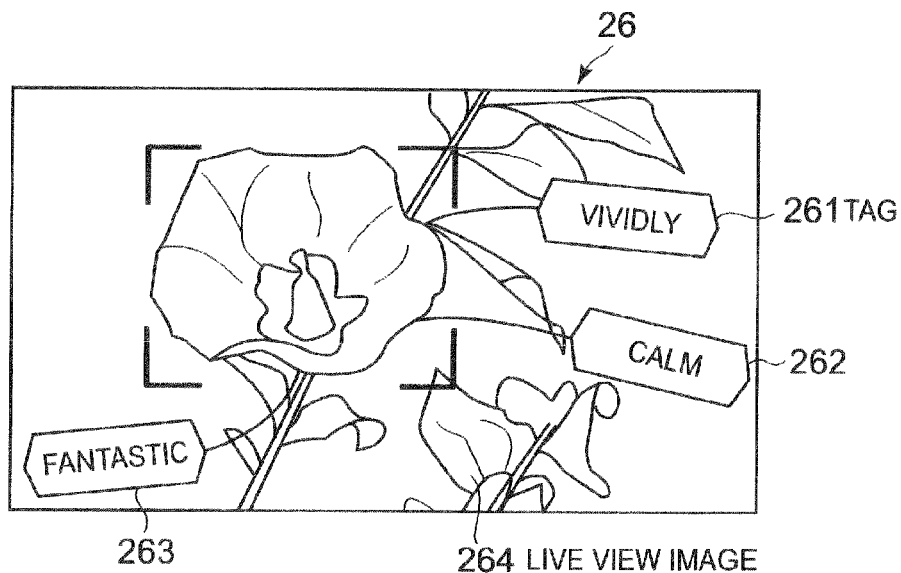
FIG. 4 is a diagram showing an example of a display transition diagram according to the same embodiment.
Figure 4B:
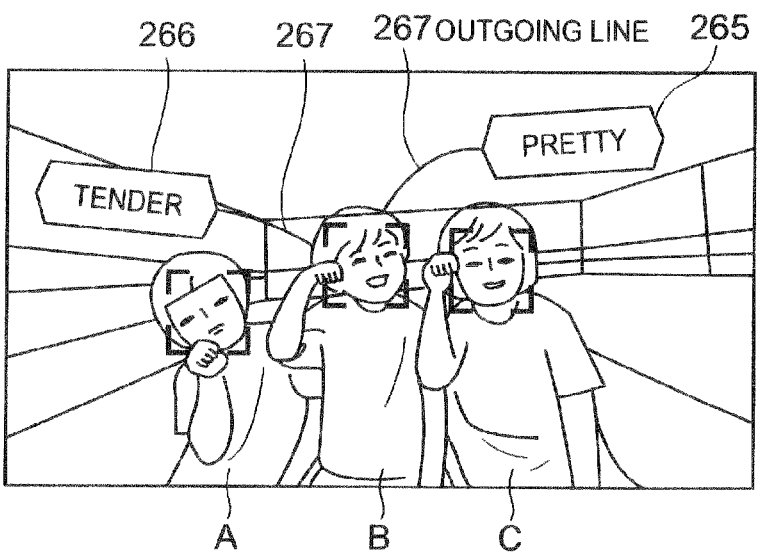
Figure 4C:
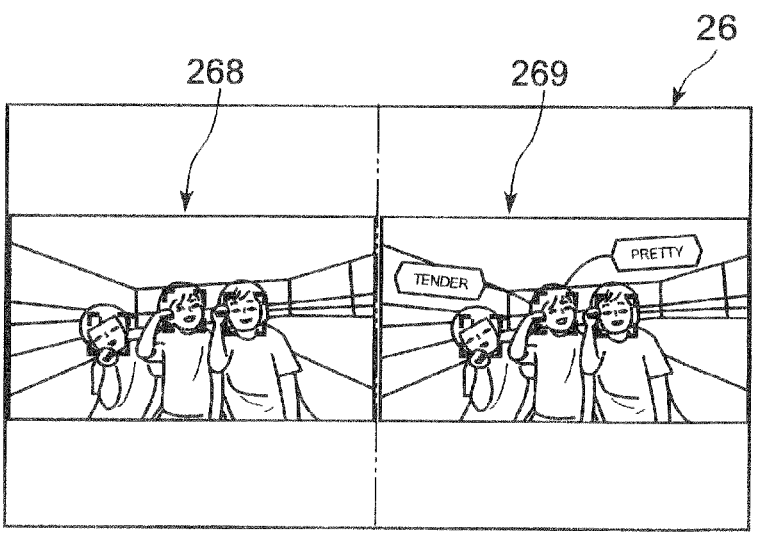

As a result of a determination at this step, in a case in which a person is not present, a display tag corresponding to the photographic scene determined at the Step S2 is read out from the correspondence table 221, and superimposed on the live view image (Step S5). Therefore, supposing that the photographic scene at Step S2 is "flower," first, display tags of "vivid," "fantastic," and "calm" are read out as display tags corresponding to the photographic scene "flower" from the photographic scene correspondence table 221. In addition, as indicated in FIG. 4(*a*), these read-out display tags 261, 262, and 263 are superimposed on the live view image.

Furthermore, as a result of the determination at Step S4, in a case of a photographic scene in which a person is present, it is determined whether the person is a registered person (Step S6). That is to say, a face is detected from one frame of an image in the DRAM 21, and characteristic data for the face is extracted. In a case in which pluralities of faces are present, each of the pluralities of faces is detected, and characteristic data for each of the faces is extracted. Then, this extracted characteristic data and characteristic data stored in the database 29 are compared to determine a degree of similarity, and it is determined whether a detected face is a face registered in the database 29.

In a case of being a face registered in the database 29 (a case of a registered person being present), a display tag corresponding to the photographic scene determined at the Step S2 is read out from the photographic scene correspondence table 221, linked to the registered person, and superimposed on the live view image (Step S7). Therefore, supposing the photographic scene at Step S2 is "child," first, display tags "pretty" and "tender" corresponding to the photographic scene "child" are read out from the photographic scene correspondence table 221. Then, as shown in FIG. 4(*b*), these read-out display tags 265 and 266 are superimposed on the live view image 264. Furthermore, in this live view image 264, supposing that of the persons A, B, and C, person B is a registered person, the tags 265 and 266 are displayed in a state of each being linked to registered person B through outgoing lines 267.

Therefore, it is possible for the user visually to recognize these tags 265 and 266 together with the live view image 264. In addition, by the user visually recognizing these tags, it is possible to recognize that manual setting is possible for photographing an image in which the tag-linked registered person B has been made "pretty" or "tender."

Furthermore, the live view image 264 displayed in the display unit 26 is an image in which automatic parameters have been set and are controlled in Step S3 as described above. Therefore, by the user viewing this live view image 264, it is possible to recognize image attributes (an impression of that image) in a case of having photographed in fully automatic mode.

In addition, as a result of the determination in Step S6, in a case in which a registered person does not exist, a display tag corresponding to the photographic scene determined in the Step S2 is read out from the photographic scene correspondence table 221, linked to the person in the center, and superimposed on the live view image (Step S8). Therefore, supposing that a photographic scene in Step S2 is "child," first, display tags "pretty" and "tender" corresponding to the photographic scene "child" are read out from the photographic scene correspondence table 221. Then, as shown in FIG. 4(*b*), these readout display tags 265 and 266 are superimposed on the live view image 264. Furthermore, in this live view image 264, supposing that of the persons A, B, and C, person B is a person in the center, the tags 265 and 266 are displayed in a state of each being linked to registered person B through outgoing lines 267.

Moreover, in this flowchart, in a case in which there is no person in the live view image, tags are caused to display without being linked by the outgoing lines 267, but it is also possible in this case, as shown in FIG. 4(*a*), to link the outgoing lines 267 to a main subject image ("flower" in the case of this example) in the photographic scene, and to display tags 261, 262, and 263. As a result, when the user visually recognizes these tags 261, 262, and 263, it is possible to recognize such as that manual setting of photography conditions for "vividly" photographing a linked subject image is possible.

Furthermore, on the other hand, it is also possible, regardless of the photographic scene, not to link the tags to any specific subject image, but just to align and display thereof on such as a side portion of the display unit 26.

In addition, in Step S9 following any of Steps S5, S7, or S8, based on an operational result of the touch panel 31, it is determined whether a touch has been detected for any of the tags (Step S9). If a touch has been detected, it is determined whether the T flag (touch flag) set (=1) after touching in Step S12, described hereinafter, is in a reset state (=0). In a case in which the T flag=0, and this is a first touch after photographic scene determination, the T flag is set (=1) (Step S11).

Next, the screen of the display unit 26 is, for example, split in two between left and right (Step S12). Next, the manual parameters corresponding to the tags touched in the Step S9 are specified in the photographic scene correspondence table 221, and the manual parameters corresponding to the touched tags in the automatic parameters saved in the RAM in the controller 22 in the Step S3 are changed by one level and stored (Step S13).

Therefore, in the RAM in the controller 22, the automatic parameters stored in the Step S3, and the part-manual parameters which are the manual parameters, changed by one level, corresponding to the tags touched in the automatic parameters stored in Step S13, are concurrently in a state of being stored.

Then, image processing based on the automatic parameters and image processing based on the part-manual parameters are executed in parallel for the live view image using the image processing software (Step S14). Therefore, by processing at this Step S14, the live view image (motion image) in the case of still image photography with automatic parameters, and the live view image (motion image) in the case of still image photography with part-manual parameters are to be generated.

Then, in the screen partitioned into two in the Step S13, the live view image image-processed with the automatic parameters, that is to say, the image in a case of being photographed with fully automatic photography mode according to the photographic scene (hereinafter called "fully automatic live view image") is generated by image processing, and displayed on the left side. Furthermore, the live view image subjected to image processing artificially realizing the part-manual parameters, that is to say, the image in a case of being photographed with partly manually set photography conditions (hereinafter called "part-manual live view image") is generated by image processing, and displayed on the right side (Step S15). Therefore, by processing in this Step S15, as shown in FIG. 4(*c*), a fully automatic live view image 268 is displayed on the left side of display unit 26, and a part-manual live view image 269 is displayed on the right side thereof.

Therefore, by the user visually comparing this fully automatic live view image 268 and this part-manual live view image 269, it is possible to confirm and learn how the image changes, according to manual setting, by touch to a tag.

Moreover, in the part-manual live view image 269, the tags 265 and 266 continue to be displayed as shown in the drawing.

Next, it is determined whether the clear key of key input unit 30 has been operated (Step S16), and in a case of the clear key having been operated, the T flag is reset (Step S17), and Step S2 is returned to. In a case of the clear key not having been operated, it is determined whether the shutter key has been operated (Step S18), and in a case of the shutter key not having been operated, Step S9 is returned to.

At this time, as described above, the tags 265 and 266 are displayed in the part-manual live view image 269, and therefore, when the tag 265 or 266 is touched, the determination of Step S9 will be YES. However, by the processing at Step 112, the T flag=1, and therefore the determination of Step S10 will be NO, and Step S14 will be proceeded to from Step S10. Then, by executing the processing of the Step S14 and Step S15 described above, the attributes of the part-manual live view image 269 change each time the user touches a tag. That is to say, the live view image (motion image) which the default parameters reflect and the live view image (motion image) which the manual setting parameters sequentially reflect will be displayed.

In this manner, when the user who has recognized a part-manual live view image 269, in which attributes change, operates the shutter key, Step S19 is proceeded to from Step S18, and the still image photographic processing described above is executed. That is to say, the controller 22 instructs switching from the live view photography mode to the still image photography mode triggered by an operation of the shutter key, performs photographic processing with parameters stored in the RAM of the controller 22 in this still image photography mode, and after temporarily storing image data obtained by this photographic processing in the SDRAM 21, stores thereof in the storage memory 28 (Step S19).

The image data stored in the storage memory 28 is obtained with photography conditions firstly fully automatically set and then later partly manually set by operation of a user. Therefore, it is possible to solve the disadvantages of inconveniencing the user with a setting operation of photography conditions while reflecting the intention of the user in the photography conditions.

Moreover, in the present embodiment, automatic parameters are made to be set according to a determined photographic scene, but it is also possible to display a tag according to the determined photographic scene without setting automatic parameters, that is to say, without fully automatic control, and to set photography conditions according to a touch for this tag. Even in this case, the displayed tags are restricted according to the determined photographic scene, and therefore the types thereof are limited. Therefore, it is possible to prevent an inconvenience of performing meaningless setting of photography conditions in the photographic scene, and as a result, it is possible to limit the inconvenience of being bothered by a setting operation of photography conditions.

Furthermore, in the present embodiment, manual parameters are made to be set by touch detection for the tag, but it is also possible to display a cursor with the tags on the display unit 26, after moving the cursor onto a desired tag by cursor key operation at the key input unit 30, select that tag by a SET key operation, and set the manual parameters according to this selected tag.

In addition, in the embodiment, an offset value is made to change in proportion to a number of operations by changing the value of the parameters from the offset value (±α) for one level each time a tag is touched (operated), but it is also possible to cause the offset to change in proportion to the touch continuation time (operation continuation time), or to set the manual parameters consisting of predetermined value for one operation for a tag.

Furthermore, it is also possible to display a photographic image immediately after still image recording, and to perform manual setting adjustment for this displayed image. That is to say, it is also possible, artificially by software-based image processing, to change and display an image hanging attributes with a certain parameter in a case of still image photography, and to perform photography reflecting this manual setting at the time of the next still image photography. In this case, the photographic image displayed immediately after the still image photography is one of an image in which only automatic parameters are reflected, an image in which automatic parameters and manual parameters are reflected, or an image in which only manual parameters are reflected.

Furthermore, although the fully automatic live view image reflecting default parameters and the part-manual live view image sequentially reflecting manual setting parameters are made to be generated artificially by image processing, it is possible actually to photography either one. That is to say, it is possible to obtain a fully automatic live view image by photography, and to generate a part-manual live view image by image processing, or to generate the fully automatic live view image by image processing, and to obtain the part-manual live view image by photographic processing.

In addition, in the present embodiment, although the invention is described with an example of a case applied to a digital camera, it is possible to apply thereof not only to a digital camera, but to a device including a function to record imported image data through an optical system and an imaging device, for example, a mobile phone with a camera or an electronic apparatus including an imaging function.

What is claimed is:

1. A camera comprising:
   a photographic unit that performs photography;
   a first storage unit that stores, for the purpose of setting a plurality of types of photographic conditions corresponding to a photographic scene, a classification of a photographic condition which can be manually set among the plurality of types of photographic conditions corresponding to the photographic scene, and an index representative of a characteristic of a subject image for a case of being photographed under the plurality of types of photographic conditions in accordance with the classified photographic condition;
   a photographic scene determination unit that determines a photographic scene, based on a subject image to be photographed by the photographic unit;
   an automatic setting unit that sets the plurality of types of photographic conditions based on the photographic scene determined by the photographic scene determination unit;
   a display unit that displays the index corresponding to the classified photographic condition which can be manually set, based on the photographic scene determined by the photographic scene determination unit;
   a manual setting unit that changes the manually settable classified photographic condition corresponding to the index, among the plurality of types of photographic conditions set by the automatic setting unit, according to a specifying operation of a user in response to the index displayed by the display unit; and
   a control unit that performs photography by the photographic unit in accordance with the photographic condition changed by the manual setting unit, and the other photographic conditions which are set by the automatic setting unit and which have not been changed by the manual setting unit.

2. A camera according to claim 1, wherein the manual setting unit changes the photographic condition step by step according to the specifying operation.

3. A camera according to claim 1, wherein the display unit displays, in addition to the index, the subject image to be photographed under the plurality of types of photographic conditions set by the automatic setting unit.

4. A camera according to claim 1, further comprising a display control unit that controls the display unit to display: (i) the subject image to be photographed in accordance with the photographic condition before the chancre by the manual setting unit, and (ii) the subject image to be photographed in accordance with the photographic condition after the change by the manual setting unit.

5. A camera according to claim 4, further comprising a generation unit that generates, by image processing: (i) the subject image to be photographed in accordance with the photographic condition before the change by the manual setting unit, and (ii) the subject image to be photographed in accordance with the photographic condition after the chancre by the manual setting unit;
wherein the display unit displays the subject images generated by the generation unit.

6. A camera according to claim 1, wherein the display unit displays the index in a display state of being linked to the subject image.

7. A camera according to claim 1, further comprising a second storage unit which stores features of a specific person;
wherein the photographic scene determination unit determines the photographic scene based on whether or not the subject image is the specific person stored in the second storage unit.

8. A photographic method for a camera, which includes a photographic unit and a storage unit that stores, for the purpose of setting a plurality of types of photographic conditions corresponding to a photographic scene, a classification of a photographic condition which can be manually set among the plurality of types of photographic conditions corresponding to the photographic scene, and an index representative of a characteristic of a subject image for a case of being photographed under the plurality of types of photographic conditions in accordance with the classified photographic condition, the photographic method comprising:
determining a photographic scene based on a subject image to be photographed by the photographic unit;
automatically setting the plurality of types of photographic conditions based on the determined photographic scene;
displaying the index corresponding to the classified photographic condition which can be manually set, based on the determined photographic scene;
changing the manually settable classified photographic condition corresponding to the index, among the plurality of types of automatically set photographic conditions, according to a specifying operation of a user in response to the displayed index; and
performing photography by the photographic unit in accordance with the changed photographic condition, and the other photographic conditions which are automatically set, and which have not been manually changed.

9. A non-transitory computer-readable storage medium storing a program executable by a computer provided in a camera, the program causing the computer to function as units including:
a first storage unit that stores, for the purpose of setting a plurality of types of photographic conditions corresponding to a photographic scene, a classification of a photographic condition which can be manually set among the plurality of types of photographic conditions corresponding to the photographic scene, and an index representative of a characteristic of a subject image for a case of being photographed under the plurality of types of photographic conditions in accordance with the classified photographic condition;
a photographic scene determination unit that determines a photographic scene based on a subject image to be photographed by a photographic unit;
an automatic setting unit that sets the plurality of types of photographic conditions based on the photographic scene determined by the photographic scene determination unit;
a display unit that displays the index corresponding to the classified photographic condition which can be manually set, based on the photographic scene determined by the photographic scene determination unit;
a manual setting unit that changes the manually settable classified photographic condition corresponding to the index, among the plurality of types of photographic conditions set by the automatic setting unit, according to a specifying operation of a user in response to the index displayed by the display unit; and
a control unit that performs photography by the photographic unit in accordance with the photographic condition changed by the manual setting unit, and the other photographic conditions which are set by the automatic setting unit and which have not been changed by the manual setting unit.

* * * * *